US010764817B2

United States Patent
Huang et al.

(10) Patent No.: US 10,764,817 B2
(45) Date of Patent: Sep. 1, 2020

(54) METHOD, APPARATUS AND SYSTEM FOR DISCOVERY REFERENCE SIGNAL MEASUREMENT IN A LICENSE ASSISTED ACCESS SCENARIO

(71) Applicant: Intel IP Corporation, Santa Clara, CA (US)

(72) Inventors: Rui Huang, Beijing (CN); Yang Tang, Pleasanton, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/069,149

(22) PCT Filed: May 27, 2016

(86) PCT No.: PCT/US2016/034831
§ 371 (c)(1),
(2) Date: Jul. 10, 2018

(87) PCT Pub. No.: WO2017/138974
PCT Pub. Date: Aug. 17, 2017

(65) Prior Publication Data
US 2019/0045428 A1    Feb. 7, 2019

Related U.S. Application Data

(60) Provisional application No. 62/292,721, filed on Feb. 8, 2016.

(51) Int. Cl.
*H04W 48/16* (2009.01)
*H04L 5/00* (2006.01)
(Continued)

(52) U.S. Cl.
CPC .......... *H04W 48/16* (2013.01); *H04L 5/0048* (2013.01); *H04L 5/0091* (2013.01); *H04W 16/14* (2013.01);
(Continued)

(58) Field of Classification Search
CPC ... H04L 5/0091; H04L 5/0048; H04L 5/0023; H04W 48/16; H04W 16/14; H04W 76/11; H04W 24/10; H04W 76/27
See application file for complete search history.

(56) References Cited

U.S. PATENT DOCUMENTS 10,206,132 B2 *    2/2019   Park .................... H04W 16/32
2013/0336156 A1   12/2013  Wei et al.
(Continued)

FOREIGN PATENT DOCUMENTS

WO    2015182915 A1   12/2015
WO    2016003099 A1    1/2016

OTHER PUBLICATIONS

International Bureau—International Search Report and Written Opinion dated Oct. 28, 2016 from International Application No. PCT/US2016/034831, 14 pages.
(Continued)

*Primary Examiner* — Brian D Nguyen
(74) *Attorney, Agent, or Firm* — Schwabe, Williamson & Wyatt, P.C.

(57) ABSTRACT

Machine-readable media, methods, apparatus and system for discovery reference signal measurement in a license assisted access scenario are disclosed. In some embodiments, an apparatus for a user equipment (UE), comprising a control circuitry to: perform, in response to a discovery reference signal (DRS) based measurement request, a single DRS based measurement or multiple DRS based measurements, based at least in part on a measurement related information
(Continued)

element (IE), wherein the measurement related IE comprises an indication of whether the single DRS based measurement or the multiple DRS based measurements associated with a license assisted access (LAA) scenario are to be performed; and, generate a DRS based measurement report, wherein if the measurement related IE indicates the multiple DRS based measurements, the DRS based measurement report further comprises an average DRS based measurement result of the multiple DRS based measurements.

23 Claims, 5 Drawing Sheets

(51) Int. Cl.
*H04W 16/14* (2009.01)
*H04W 24/10* (2009.01)
*H04W 76/11* (2018.01)
*H04W 76/27* (2018.01)

(52) U.S. Cl.
CPC ............ *H04W 24/10* (2013.01); *H04W 76/11* (2018.02); *H04W 76/27* (2018.02); *H04L 5/0023* (2013.01)

(56) References Cited

U.S. PATENT DOCUMENTS

| | | | |
|---|---|---|---|
| 2015/0092655 A1 | 4/2015 | Liao et al. | |
| 2015/0365152 A1 | 12/2015 | Frenne et al. | |
| 2016/0227571 A1* | 8/2016 | Baek | H04W 16/14 |
| 2017/0215097 A1* | 7/2017 | Park | H04B 17/318 |
| 2017/0245168 A1* | 8/2017 | Yi | H04W 24/00 |
| 2018/0227838 A1* | 8/2018 | Hayashi | H04L 5/001 |
| 2018/0242283 A1* | 8/2018 | Feng | H04L 5/001 |

OTHER PUBLICATIONS

3GPP, "Technical Specification Group Radio Access Network; Evolved Universal Terrestrial Radio Access (E-UTRA); Radio Resource Control (RRC); Protocol specification (Release 13)," 3GPP TS 36.331 V13.0.0 (Dec. 2015), Jan. 7, 2016, Lte Advanced Pro, 507 pages.

3GPP, "Technical Specification Group Radio Access Network; Evolved Universal Terrestrial Radio Access (E-UTRA); Requirements for support of radio resource management (Release 13)," 3GPP TS 36.133 V13.2.0 (Jan. 2016), Jan. 8, 2016, Lte Advanced Pro, 1,517 pages.

Ericsson, "LAA measurement requirements," 3GPP TSG-RAN WG4 Meeting #77, R4-158388, Change Request, 36133, CR 3262, rev 1, Current version: 13.1.0, Nov. 16-20, 2015, Anaheim, CA, USA, 17 pages.

* cited by examiner

METHOD, APPARATUS AND SYSTEM FOR DISCOVERY REFERENCE SIGNAL MEASUREMENT IN A LICENSE ASSISTED ACCESS SCENARIO

CROSS REFERENCE TO RELATED APPLICATIONS

The present application is a national phase entry under 35 U.S.C. § 371 of International Application No. PCT/US2016/034831, filed May 27, 2016, entitled "METHOD, APPARATUS AND SYSTEM FOR DISCOVERY REFERENCE SIGNAL MEASUREMENT IN A LICENSE ASSISTED ACCESS SCENARIO", which designates the United States of America, which claims priority to a U.S. Provisional Patent Application No. 62/292,721, filed Feb. 8, 2016, the entire disclosures of which are hereby incorporated by reference.

FIELD

Embodiments of the present application relate generally to the field of wireless communications, and more particularly, to methods, apparatuses and systems for discovery reference signal measurement in a license assisted access scenario in a wireless network.

BACKGROUND INFORMATION

In a wireless network, e.g., in compliance with the Long Term Evolution (LTE) standards of 3rd Generation Partnership Project along with any amendments, updates and/or revisions, licensed spectrum may deliver high-quality services with high spectral efficiency. However, in order to meet increasing market demands, there may be increasing interest from operators in deploying compromising accesses utilizing unlicensed spectrum which may be used as a license assisted access (LAA) scenario integrated into LTE.

BRIEF DESCRIPTION OF THE DRAWINGS

Embodiments of the present application are illustrated by way of example, and not by way of limitation, in the figures of the accompanying drawings in which like reference numerals refer to similar elements.

DESCRIPTION OF THE EMBODIMENTS

Illustrative embodiments of the present disclosure include, but are not limited to, methods, systems, and apparatuses for DRS based measurement and reporting in the LAA scenario in a wireless communication network, e.g., in compliance with the Long Term Evolution (LTE) standards of 3rd Generation Partnership Project along with any amendments, updates and/or revisions.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
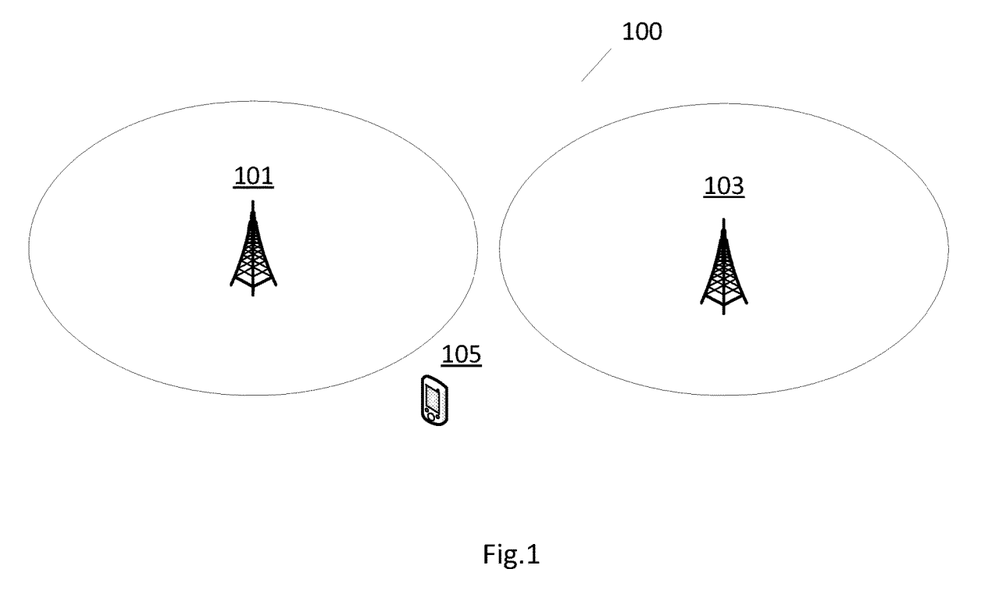
FIG. 1 schematically illustrates a wireless communication network for discovery reference signal (DRS) measurement and reporting in a license assisted access (LAA) scenario, in accordance with various embodiments.

FIG. 1 schematically illustrates a wireless communication network for discovery reference signal (DRS) measurement and reporting in a license assisted access (LAA) scenario, in accordance with various embodiments. As illustrated in FIG. 1, the wireless communication network 100 may comprise a master evolved Node B (MeNB) 101 providing wireless access in a primary coverage area 102, a secondary evolved Node B (SeNB) 103 providing wireless access in a secondary coverage area 104, a user equipment 105, and/or others. The wireless communication network 100 may use a variety of wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and/or others in compliance with an Institute of Electrical and Electronics Engineers (IEEE) 602 system, a 3rd Generation Project Partnership (3GPP) system, a 3GPP Long Term Evolution (LTE) system, and/or a 3GPP2 system.

In some embodiments, the MeNB 101 may operate in a non-LAA scenario, e.g., providing the wireless access utilizing the licensed spectrum; and, SeNB 103 may integrate the LAA scenario, e.g., providing wireless access for the UE utilizing an unlicensed spectrum. In some situations, UE 105 may perform measurement with discovery reference signal (DRS) and report the measurement result to the MeNB 101 for LAA radio resource management (RRM) functionalities, e.g., cell identification for handover between Scells (e.g., between SeNB 103 and another SeNB not shown in FIG. 1) and/or robust operation in the unlicensed band.

Figure 2:
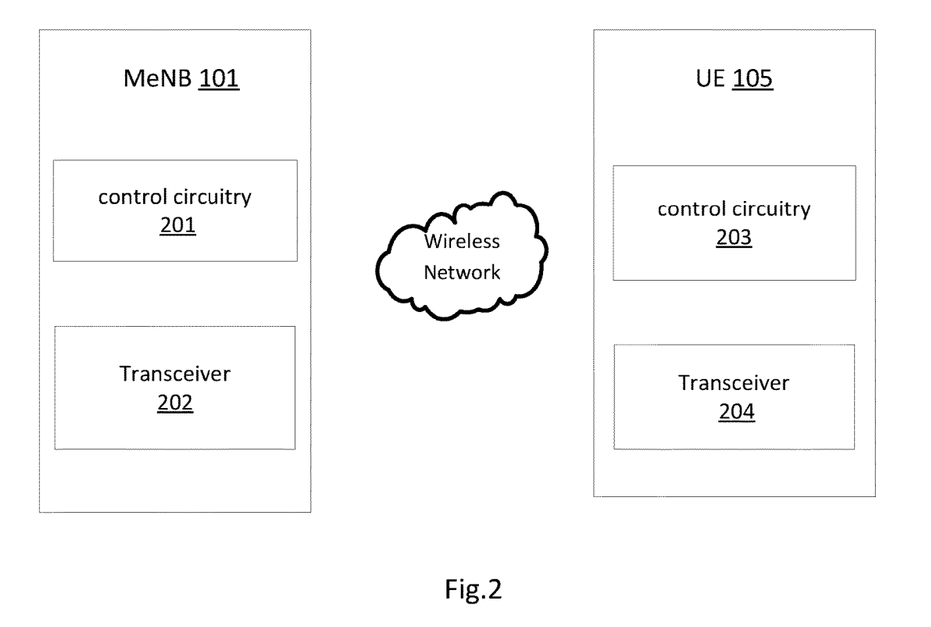
FIG. 2 schematically illustrates a wireless system having a master evolved Node B (MeNB) and an user equipment (UE) for the DRS based measurement and reporting in the LAA scenario, in accordance with various embodiments.

FIG. 2 schematically illustrates a wireless system having an evolved Node B (e.g., MeNB 103) and a user equipment (e.g., UE 105) for the DRS based measurement and reporting in the LAA scenario, in accordance with various embodiments. As illustrated in FIG. 2, MeNB 101 may comprise a control circuitry 201, a transceiver 202, and/or others; and UE 105 may comprise a control circuitry 203, a transceiver 204, and/or others. In some embodiments, control circuitry 201 of MeNB 101 may determine a DRS based measurement related information element (IE) indicating a single shot measurement or multiple shots measurements on DRS(s) that UE 105 receives from another eNB (e.g., SeNB 103) in the LAA scenario, based at least in part on a certain criteria. Examples of the DRS may include, but not limited to, primary synchronization signal (PSS), secondary synchronization signal (SSS), cell reference signal (CRS), channel state information-reference signal (CSI-RS), etc.

In some embodiments, MeNB 101 may determine the DRS based measurement related IE based at least in part on a mobility status of UE 105. For example, if the UE mobility status is higher than a threshold, e.g., when UE 105 moves fast, MeNB 101 may determine the DRS based measurement related IE to indicate the single shot measurement. However, if the UE mobility status is lower than the threshold, e.g., when UE 105 moves slowly, MeNB 101 may determine the DRS based measurement related IE to indicate the multiple shots measurements. In some embodiments, MeNB 101 may determine the DRS based measurement related IE, based at least in part on whether contiguous DRS occasions from SeNB 103 are detected within a measurement period. For example, if MeNB 101 detects the contiguous DRS occasions from SeNB 103 in the LAA scenario, such as two or more adjacent DRS occasions, MeNB 101 may determine the DRS based measurement related IE indicating the multiple DRS based measurements. However, if no contiguous DRS occasions from SeNB in the LAA scenario, MeNB 101 may determine the DRS based measurement related IE to indicate the single shot measurement.

The DRS based measurement related IE may comprise a MeasObjectEUTRA IE as in the following and may be proposed into section 6.3.5 of LTE TS 36.331:

```
--ASN1START
MeasObjectEUTRA ::=        SEQUENCE{
    LAARRM-MeasType-r13    ENUMERATED {one, multi}
    ...
}
--ASN1STOP
```

In some embodiments, control circuitry 201 of MeNB 101 may further control the LAA RRM based on a DRS based measurement result received from UE 105, based at least in part on the DRS based measurement result from the UE, in which the DRS based measurement result may comprise an average of multiple DRS based measurement results, if the MeasObjectEUTRA IE indicates the multiple DRS based measurements. In case that the single shot measurement or the multiple shots measurements may comprise reference signal receiving power (RSRP) measurement, reference signal receiving quality (RSRQ) measurement, and/or other measurement based on the DRS(s) received from SeNB 103, the DRS based measurement result may comprise the result of the RSRP measurement, RSRQ measurement, and/or other measurement result based on the DRS(s). In some embodiments, the LAA RRM may comprise cell identification for handover between SeNBs (e.g., the SeNB 103 and another SeNB not shown in FIG. 1) and/or robust operation in the unlicensed band. For example, if the DRS based measurement result is higher than a threshold, MeNB 101 may instruct the handover for UE 105 from the secondary cell 103 to another secondary cell (not shown in FIG. 1).

In some embodiments, transceiver 202 of MeNB 101 may transmit the MeasObjectEUTRA IE for LAA RRM to transceiver 204 of UE 105 via a radio resource control (RRC) connection established between MeNB 101 and UE 105. Moreover, transceiver 202 may transmit a DRS based measurement request to the UE 105. For example, transceiver 202 may transmit the request in response to the increasing cellular load of MeNB 101 in the licensed spectrum. In some embodiments, transceiver 204 of UE 105 may receive the MeasObjectEUTRA and the DRS based measurement request from MeNB 101, e.g., via the RRC connection. Transceiver 204 may further receive the DRS(s) from SeNB 103 in the LAA scenario. In a measurement window, transceiver 204 may receive no DRS, one or more DRSs, depending on transmission opportunities for SeNB 103 to transmit the DRS(s) in unlicensed spectrum.

It should be understood that other technologies may implement other embodiments for the MeasObjectEUTRA IE and the DRS based measurement request. For example, the DRS based measurement request may include the MeasObject EUTRA IE.

In some embodiments, control circuitry 203 of UE 105 may perform the DRS based measurement on the received DRS(s) and report the measurement result, based at least in part on the MeasObjectEUTRA IE received from MeNB 101. In case that the MeasObjectEUTRA IE indicates the single shot measurement, control circuitry 203 may perform one measurement on DRS received during the measurement window and report the measurement result to MeNB 101.

In case that the MeasObjectEUTRA IE indicates multiple shots measurements, control circuitry 203 may perform multiple shots measurements on multiple DRSs received during the measurement window, and report an average of the measurement results to MeNB 101.

Moreover, it may be proposed to add the following accuracy requirements for measurements under operation with frame structure 3 (i.e., the frame structure for LAA) into section 9.1.18 of LTE TS 36.331, which might be useful for a manufacturer to test the UE's measurement performance, wherein the LAA measurement type 1 may comply with LTE FDD protocol:

9.1.18.2.1.1 Absolute RSRP accuracy measurement with LAAMeasurmentType1:

TABLE 9.1.18.1-1

| RSRP Intra frequency absolute accuracy |||||||
|---|---|---|---|---|---|---|
| Accuracy ||| Conditions ||||
| ||| | | $I_o^{Note\ 1}$ range ||
| ||| E-UTRA | | | |
| Normal condition | Extreme condition | $\hat{E}s/Iot$ | operating band | Minimum Io || Maximum Io |
| dB | dB | dB | groups$^{Note\ 3}$ | dBm/15 kHz$^{Note\ 2}$ | dBm/BW$_{Channel}$ | dBm/BW$_{Channel}$ |
| ±6 | ±10.5 | ≥−6 dB | FDD_A, TDD_A | −121 | N/A | −70 |
| | | | FDD_B | −120.5 | N/A | −70 |
| | | | FDD_C, TDD_C | −120 | N/A | −70 |
| | | | FDD_D | −119.5 | N/A | −70 |
| | | | FDD_E, TDD_E | −119 | N/A | −70 |
| | | | FDD_F | −118.5 | N/A | −70 |
| | | | FDD_G | −118 | N/A | −70 |
| | | | FDD_H | −117.5 | N/A | −70 |
| | | | FDD_N | −114.5 | N/A | −70 |
| ±9.5 | ±12.5 | ≥−6 dB | FDD_A, TDD_A, FDD B, FDD_C, TDD_C, FDD_D, FDD_E, TDD_E, FDD_F, FDD_G, FDD_H, FDD_N | N/A | −70 | −50 |

$^{Note\ 1}$Io is assumed to have constant EPRE across the bandwidth.
$^{Note\ 2}$The condition level is increased by Δ > 0, when applicable, as described in Sections B.4.2 and B.4.3.
$^{Note\ 3}$E-UTRA operating band groups are as defined in Section 3.5.

Figure 3:
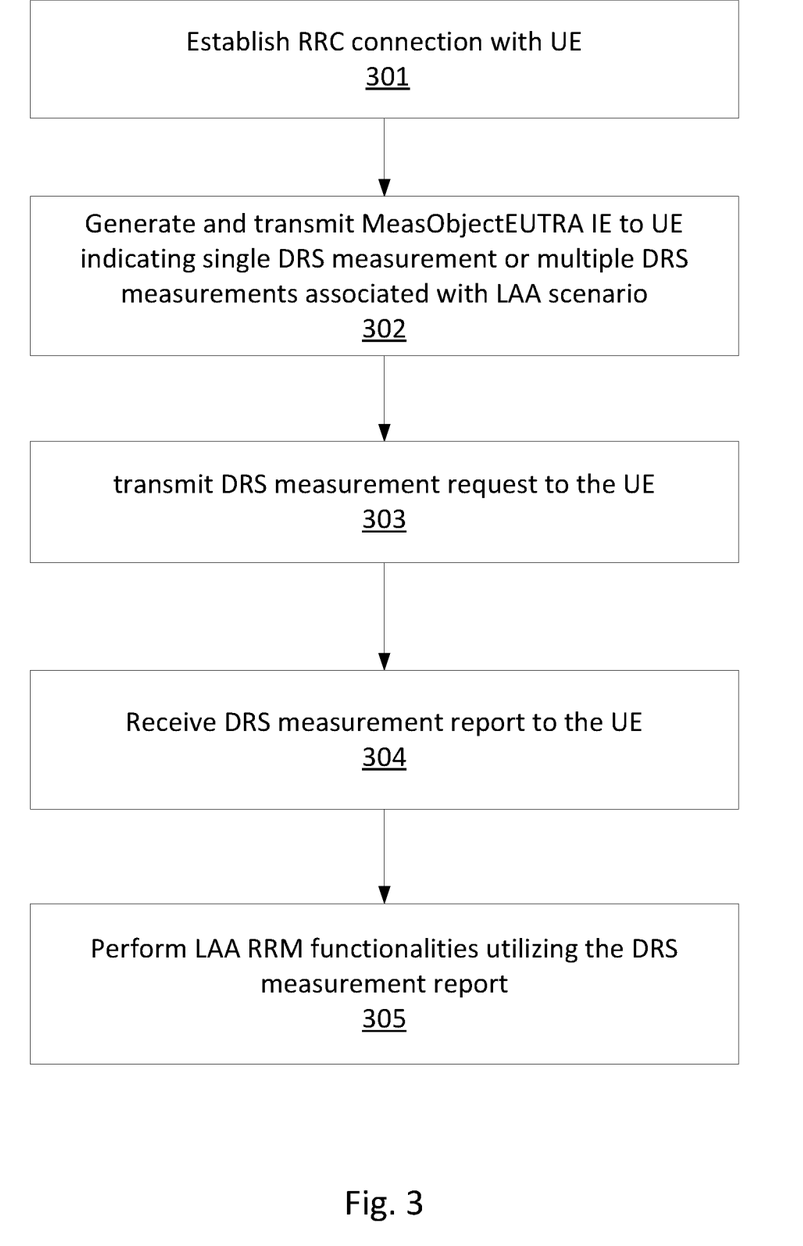
FIG. 3 schematically illustrates a method of the DRS based measurement and reporting in the LAA scenario by the MeNB in the wireless system of FIG. 2, in accordance with various embodiments.

FIG. 3 schematically illustrates a method of the DRS based measurement and reporting in the LAA scenario by the eNB in the wireless system of FIG. 2, in accordance with various embodiments. In some embodiments, transceiver 202 or other device of MeNB 101 may establish a RRC connection with transceiver 204 or other device of UE 105, in block 301. In block 302, control circuitry 201 or other device of MeNB 101 may determine the DRS based measurement related IE (e.g., MeasObjectEUTRA IE) indicating the single DRS based measurement or multiple DRS based measurement associated with the LAA scenario, based at least in part on a certain criteria such as the mobility status of UE 105, contiguous or non-contiguous DRSs detected from SeNB 103 in the LAA scenario, and/or others. Transceiver 202 or other devices of MeNB 101 may transmit the MeasObjectEUTRA IE to UE 105, via RRC connection.

In block 303, transceiver 202 or other devices of MeNB 101 may transmit the DRS based measurement request to UE 105. In block 305, transceiver 202 or other devices of MeNB 101 may receive a DRS based measurement report from UE 105, in which the DRS based measurement report may include the average of multiple DRS based measurements performed by UE 105. In block 306, control circuitry 201 or other devices of MeNB 101 may utilize the DRS based measurement report for LAA RRM functionalities, e.g., cell identification for handover between Scells (e.g., between SeNB 103 and another SeNB not shown in FIG. 1) and/or robust operation in the unlicensed band.

However, it should be understood that other technologies may implement other embodiments for the method of FIG. 3. For example, transceiver 202 or other devices of MeNB 101 may transmit the DRS based measurement request before the MeasObjectEUTRA IE or together with the MeasObjectEUTRA IE.

Figure 4:
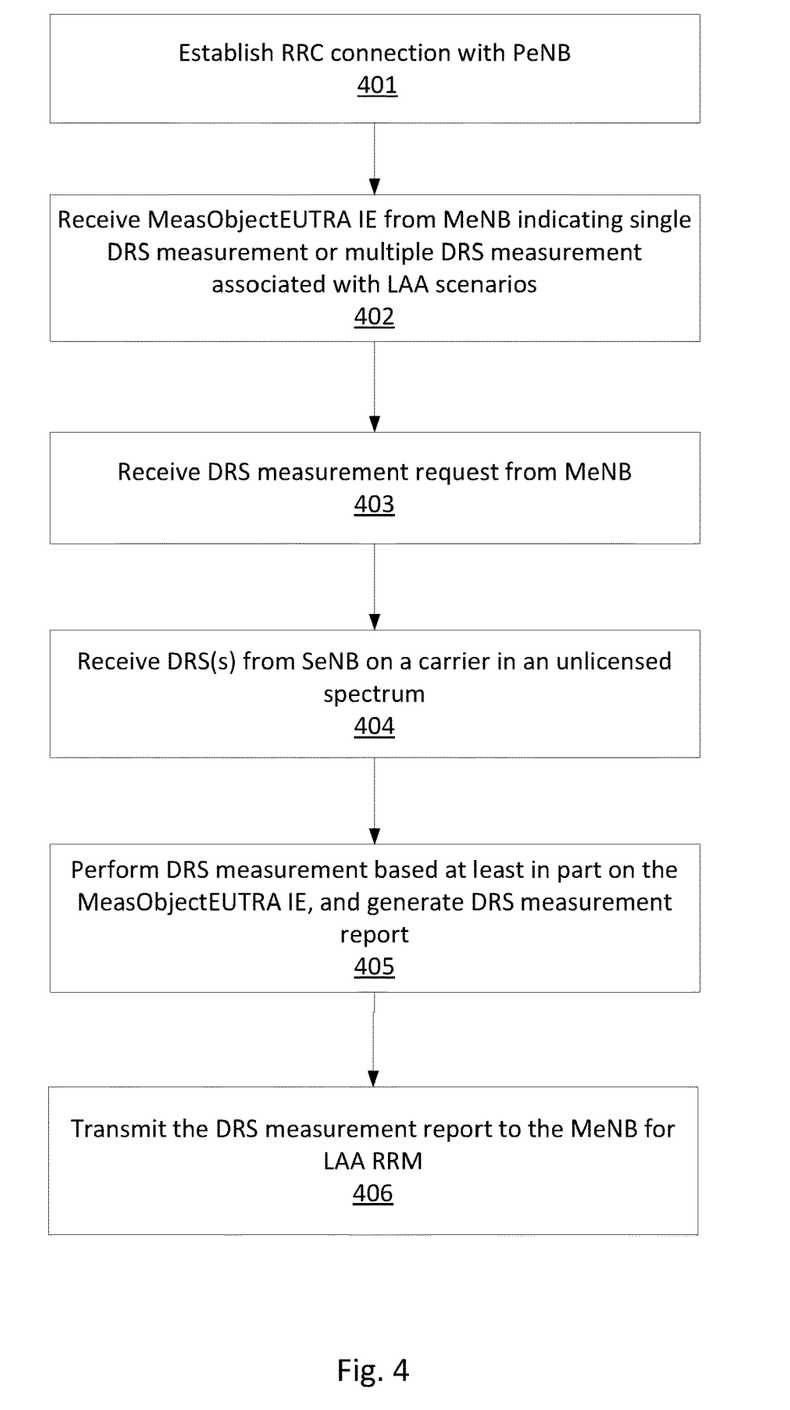
FIG. 4 schematically illustrates a method of the DRS based measurement and reporting in the LAA scenario by the UE in the wireless system of FIG. 2, in accordance with various embodiments.

FIG. 4 schematically illustrates a method of the DRS based measurement and reporting in the LAA scenario by the UE in the wireless system of FIG. 2, in accordance with various embodiments. In block 401, transceiver 203 or other devices of UE 105 may establish the RRC connection with MeNB 101 in non-LAA scenario. In block 402, transceiver 203 or other devices of UE 105 may receive DRS based measurement related IE, e.g., MeasObjectEUTRA IE, indicating the single DRS based measurement or multiple DRS based measurements associated with the LAA scenario. In block 403, transceiver 203 or other devices of UE 105 may receive the DRS based measurement request from MeNB 101. In block 404, transceiver 203 or other devices of UE 105 may receive DRS(s) from SeNB 103 on a carrier in unlicensed spectrum. In block 405, control 203 other device of UE 105 may perform the DRS based measurement on the DRS(s) based at least in part on the MeasObjectEUTRA IE, and generate the measurement report. For example, if the MeasObjectEUTRA IE indicates the single shot measurement, control circuitry 203 or other device may perform one measurement on DRS received during the measurement window and report the measurement result to MeNB 101. For another example, if the MeasObjectEUTRA IE indicates multiple shots measurements, control circuitry 203 may perform multiple shots measurements on multiple DRSs received during the measurement window, and report an average of the measurement results to MeNB 101.

In block 406, transceiver 204 or other device of UE 105 may transmit the DRS based measurement report to MeNB 101 for LAA RRM functionality, such as cell identification for handover between Scells (e.g., between SeNB 103 and another SeNB not shown in FIG. 1) and/or robust operation in the unlicensed band.

Figure 5:
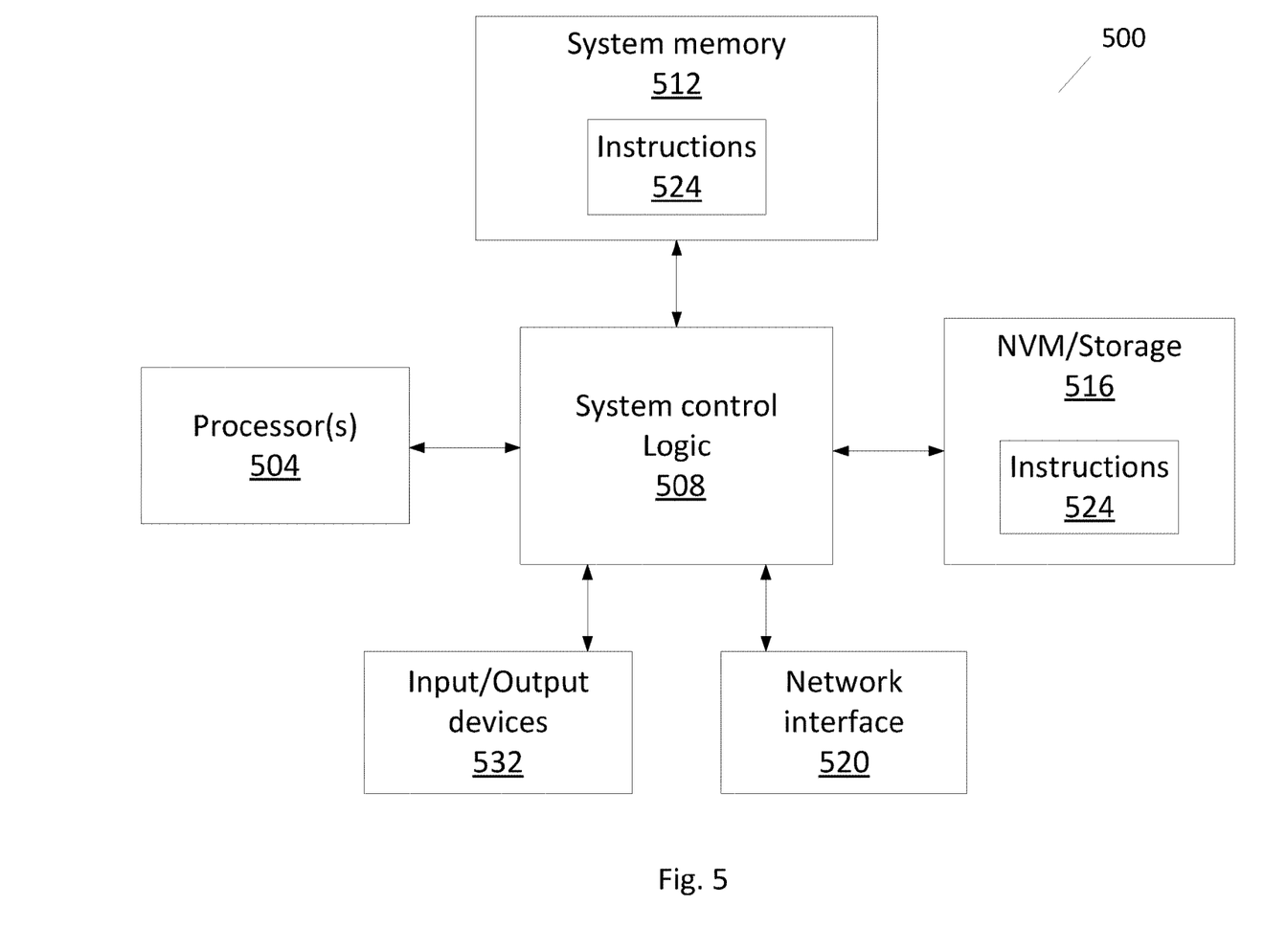
FIG. 5 schematically illustrates an example system in accordance with various embodiments.

FIG. 5 schematically illustrates an example system 500 in accordance with various embodiments. In an embodiment, the system 500 may comprise one or more processor(s) 504, system control logic 508 coupled with at least one of the processor(s) 504, system memory 512 coupled with system control logic 508, non-volatile memory (NVM)/storage 516 coupled with system control logic 508, and a network interface 520 coupled with system control logic 508.

Processor(s) 504 may include one or more single-core or multi-core processors. Processor(s) 504 may include any combination of general-purpose processors and dedicated processors (e.g., graphics processors, application processors, baseband processors, etc.). In an embodiment in which the system 500 implements the MeNB 101 or UE 105, processors(s) 504 may be configured to execute one or more embodiment(s) as illustrated in FIGS. 1-4 in accordance with various embodiments.

System control logic 508 for one embodiment may include any suitable interface controllers to provide for any suitable interface to at least one of the processor(s) 504 and/or to any suitable device or component in communication with system control logic 508.

System control logic 508 for one embodiment may include one or more memory controller(s) to provide an interface to system memory 512. System memory 512 may be used to load and store data and/or instructions, for example, for system 500. System memory 512 for one embodiment may include any suitable volatile memory, such as suitable dynamic random access memory (DRAM), for example.

NVM/storage 516 may include one or more tangible, non-transitory computer-readable media used to store data and/or instructions, for example. NVM/storage 516 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 516 may include a storage resource physically part of a device on which the system 500 is installed or it may be accessible by, but not necessarily a part of, the device. For example, the NVM/storage 516 may be accessed over a network via the network interface 520.

System memory 512 and NVM/storage 516 may respectively include, in particular, temporal and persistent copies of instructions 524. Instructions 524 may include instructions that when executed by at least one of the processor(s) 504 result in the system 500 implementing the method as described with reference to FIGS. 3-4. In various embodiments, instructions 524, or hardware, firmware, and/or software components thereof, may additionally/alternatively be located in the system control logic 508, the network interface 520, and/or the processor(s) 504.

Network interface 520 may include the transceiver 202 of MeNB 101, the transceiver 204 of UE 105, and/or others as illustrated in FIG. 2, to provide a radio interface for system 500 to communicate over one or more network(s) and/or with any other suitable device. In various embodiments, the network interface 520 may be integrated with other components of system 500. For example, the network interface may include a processor of the processor(s) 504, memory of the system memory 512, NVM/Storage of NVM/Storage 516, and/or a firmware device (not being illustrated) having instructions that when executed by at least one of the processor(s) 504 result in the system 500 implementing the method as described with reference to FIGS. 3-4.

Network interface 520 may further include any suitable hardware and/or firmware to provide a multiple input, multiple output radio interface. Network interface 520 for one embodiment may be, for example, a network adapter, a wireless network adapter, a telephone modem, and/or a wireless modem.

For one embodiment, at least one of the processor(s) 504 may be packaged together with logic for one or more controller(s) of system control logic 508. For one embodiment, at least one of the processor(s) 504 may be packaged together with logic for one or more controllers of system control logic 508 to form a System in Package (SiP). For one embodiment, at least one of the processor(s) 504 may be integrated on the same die with logic for one or more controller(s) of system control logic 508. For one embodiment, at least one of the processor(s) 504 may be integrated on the same die with logic for one or more controller(s) of system control logic 508 to form a System on Chip (SoC).

The system 500 may further include input/output (I/O) devices 532. The I/O devices 532 may include user interfaces designed to enable user interaction with the system 500, peripheral component interfaces designed to enable peripheral component interaction with the system 500, and/or sensors designed to determine environmental conditions and/or location information related to the system 500.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 520 to communicate with components of a positioning network, e.g., a global positioning system (GPS) satellite.

In various embodiments, the system 500 may be MeNB 101, UE 105 or SeNB 103. In various embodiments, system 500 may have more or less components, and/or different architectures.

Figure 6:
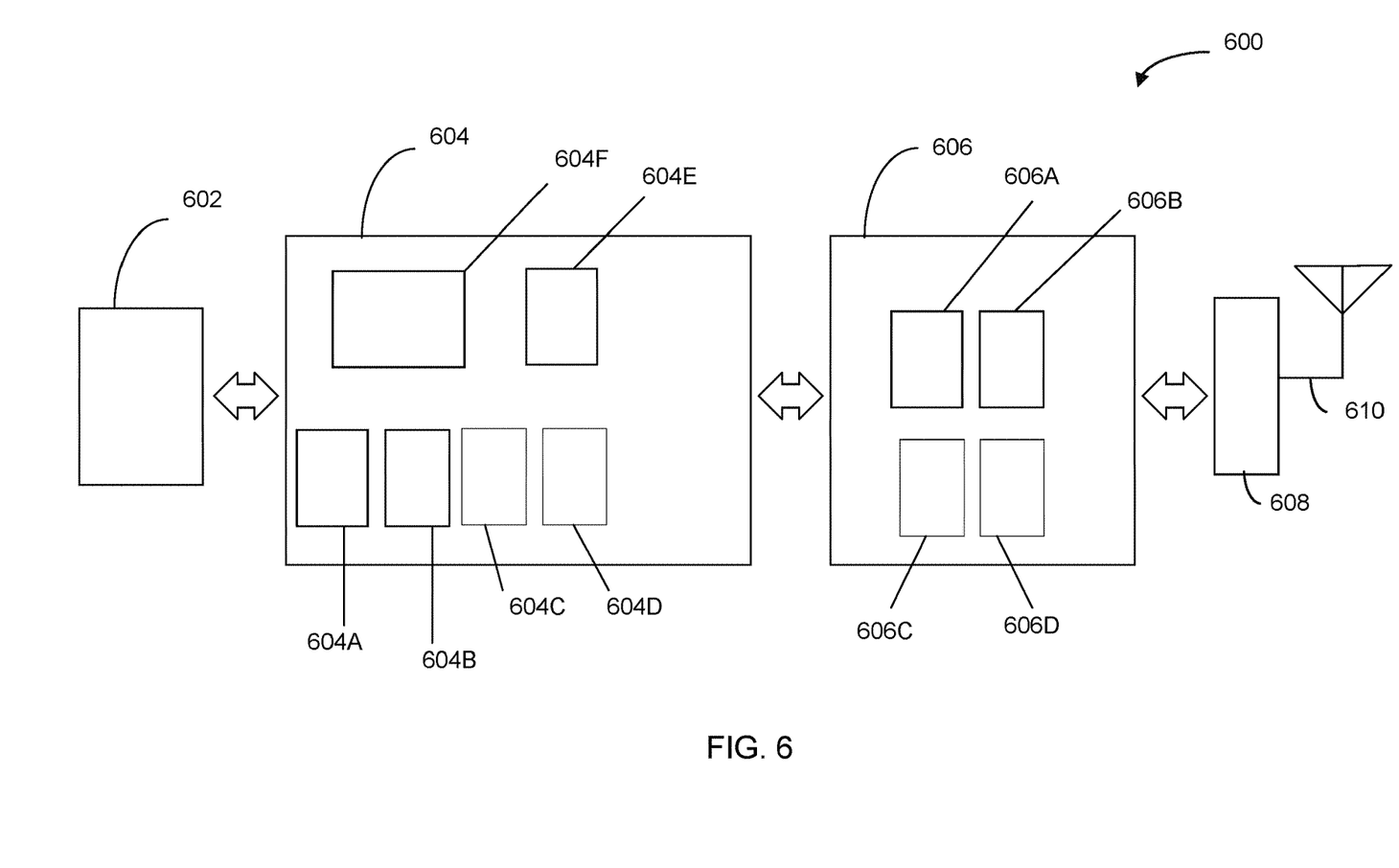
FIG. 6 schematically illustrates an example of the UE device, in accordance with various embodiments.

FIG. 6 illustrates, for one embodiment, example components of a UE device 600 in accordance with some embodiments. In some embodiments, the UE device 600 may include application circuitry 602, baseband circuitry 604, Radio Frequency (RF) circuitry 606, front-end module (FEM) circuitry 608, and one or more antennas 610, coupled together at least as shown. In some embodiments, the UE device 600 may include additional elements such as, for example, memory/storage, display, camera, sensor, and/or input/output (I/O) interface.

The application circuitry 602 may include one or more application processors. For example, the application circuitry 602 may include circuitry such as, but are not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 604 may include circuitry such as, but are not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuity 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or other baseband processor(s) 604d for other existing generations, generations in development or to be developed in the future (e.g., fifth generation (5G), 6G, etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 604e of the baseband circuitry 604 may be configured to run elements of the protocol stack for signaling of the PHY, MAC, RLC, PDCP and/or RRC layers. In some embodiments, the baseband circuitry may include one or more audio digital signal processor(s) (DSP) 604f. The audio DSP(s) 604f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and/or direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 1010, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 1010.

In some embodiments, the FEM circuitry 608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 1010.

In some embodiments, the UE 600 comprises a plurality of power saving mechanisms. If the UE 600 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 600 may transition off to an RRC_Idle state, where it disconnects from the network and does not perform operations such as channel quality feedback, handover, etc. The UE 600 goes into a very low power state and it performs paging where again it periodically wakes up to listen to the network and then powers down again. The device cannot receive data in this state; in order to receive data, it transitions back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

The disclosure may include various example embodiments disclosed below.

Example 1 may include an apparatus for a user equipment (UE), comprising: a transceiver to receive, from a first base station, a discovery reference signal (DRS) based measurement request and a measurement related information element (IE), wherein the measurement related IE comprises an indication of whether a single DRS based measurement or multiple DRS based measurements associated with a license assisted access (LAA) scenario are to be performed; and a control circuitry to perform, in response to the DRS based measurement request, the single DRS based measurement or the multiple DRS based measurements, based at least in part on the measurement related IE; and, to generate a DRS based measurement report, wherein if the measurement related IE indicates the multiple DRS based measurements, the DRS based measurement report further comprises an average DRS based measurement result of the multiple DRS based measurements.

Example 2 may include the subject matter of Example 1, and optionally, wherein the measurement related IE is a MeasObjectEUTRA IE in the LAA scenario.

Example 3 may include the subject matter of any of Examples 1-2, and optionally, wherein the transceiver is further to receive one or more DRS from a second base station in the LAA scenario.

Example 4 may include the subject matter of any of Examples 1-3, and optionally, wherein the control circuitry is further to perform the single DRS based measurement or the multiple DRS based measurements on the one or more DRS.

Example 5 may include the subject matter of any of Examples 1-4, and optionally, wherein the transceiver is further to transmit the DRS based measurement result to the first base station for mobility management including cell identification.

Example 6 may include the subject matter of any of Examples 1-5, and optionally, wherein the transceiver is to receive the measurement related IE via a radio resource control (RRC) layer.

Example 7 may include the subject matter of any of Examples 1-6, and optionally, wherein the single DRS based measurement or the multiple DRS based measurements include a reference signal receiving power (RSRP) measurement and/or a reference signal receiving quality (RSRQ) measurement on the DRS.

Example 8 may include the subject matter of any of Examples 1-7, and optionally, wherein the first base station is a master evolved Node B (MeNB), and the second base station is a secondary evolved Node B (SeNB).

Example 9 may include An apparatus of a base station, comprising: a control circuitry to generate a measurement related information element (IE) based on a certain criteria, wherein the measurement related IE comprises an indication of whether a single DRS based measurement or multiple DRS based measurements associated with a license assisted access (LAA) scenario are to be performed; and a transceiver to transmit a discovery reference signal (DRS) measurement request and the measurement related IE to a user equipment (UE).

Example 10 may include the subject matter of Example 9, and optionally, wherein the base station is in a non-LAA scenario.

Example 11 may include the subject matter of any of Examples 9-10, and optionally, wherein the control circuitry is further to generate the measurement related IE comprising the indication of the single DRS based measurement, if a mobility status of the UE is lower than a threshold.

Example 12 may include the subject matter of any of Examples 9-11, and optionally, wherein the control circuitry is further to generate the measurement related IE comprising the indication of the multiple DRS based measurements, if a mobility status of the UE is higher than a threshold.

Example 13 may include the subject matter of any of Examples 9-12, and optionally, wherein the control circuitry is further to generate the measurement related IE comprising the indication of the single DRS based measurement if no contiguous DRS within a measurement period are transmitted from another base station in the LAA scenario.

Example 14 may include the subject matter of any of Examples 9-13, and optionally, wherein the control circuitry is further to generate the measurement related IE comprising the indication of the multiple DRS based measurement if contiguous DRS within a measurement period are transmitted from another base station in the LAA scenario.

Example 15 may include the subject matter of any of Examples 9-14, and optionally, wherein the measurement related IE is a MeasObjectEUTRA IE in the LAA scenario.

Example 16 may include the subject matter of any of Examples 9-15, and optionally, wherein the transceiver is further to receive a DRS based measurement report from the UE, wherein if the measurement related IE indicates the multiple DRS based measurements, the DRS based measurement report is further to comprise an average DRS based measurement result of the multiple DRS based measurements.

Example 17 may include the subject matter of any of Examples 9-16, and optionally, wherein the control circuitry is further to control a mobility management including cell identification, based at least in part on the DRS based measurement report.

Example 18 may include the subject matter of any of Examples 9-17, and optionally, wherein the base station is a master evolved Node B (MeNB), and/or the another base station is a secondary evolved Node B (SeNB).

Example 19 may comprise a computer-readable storage medium that stores instructions for execution by a processor to perform operations of a UE or a base station, the operations, when executed by the processor to execute any of the operations discussed above in any combination.

Example 20 may comprise an apparatus for a UE or a base station comprising means for executing any of the operations discussed above in any combination.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof

What is claimed is:

1. An apparatus for a user equipment (UE), comprising:
a control circuitry to:
perform, in response to a discovery reference signal (DRS) based measurement request, a single DRS based measurement or multiple DRS based measurements, based at least in part on a measurement related information element (IE), wherein the measurement related IE comprises an indication of whether the single DRS based measurement or the multiple DRS based measurements associated with a license assisted access (LAA) scenario are to be performed; and
generate a DRS based measurement report, wherein if the measurement related IE indicates the multiple DRS based measurements, the DRS based measurement report further comprises an average DRS based measurement result of the multiple DRS based measurements; and
a transceiver circuitry to receive, from a first base station, the DRS based measurement request and the measurement related IE.

2. The apparatus of claim 1, wherein the measurement related IE is a MeasObjectEUTRA IE in the LAA scenario.

3. The apparatus of claim 1, wherein the transceiver circuitry is further to receive one or more DRS from a second base station in the LAA scenario.

4. The apparatus of claim 3, wherein the control circuitry is further to perform the single DRS based measurement or the multiple DRS based measurements on the one or more DRS.

5. The apparatus of claim 3, wherein the first base station is a master evolved Node B (MeNB), and the second base station is a secondary evolved Node B (SeNB).

6. The apparatus of claim 1, wherein the transceiver circuitry is further to transmit the DRS based measurement result to the first base station for mobility management including cell identification.

7. The apparatus of claim 1, wherein the transceiver circuitry is to receive the measurement related IE via a radio resource control (RRC) layer.

8. The apparatus of claim 1, wherein the single DRS based measurement or the multiple DRS based measurements include a reference signal receiving power (RSRP) measurement and/or a reference signal receiving quality (RSRQ) measurement on the DRS.

9. An apparatus of a base station, comprising:
a control circuitry to generate a measurement related information element (IE) based on a certain criteria, wherein the measurement related IE includes an indication of whether a single discovery reference signal (DRS) based measurement or multiple DRS based measurements associated with a license assisted access (LAA) scenario are to be performed, wherein the certain criteria includes a mobility status of a user equipment (UE) or whether contiguous DRS occasions are detected within a measurement period; and
a transceiver circuitry to transmit a DRS measurement request and the measurement related IE to a user equipment (UE).

10. The apparatus of claim 9, wherein the base station is in a non-LAA scenario.

11. The apparatus of claim 9, wherein the control circuitry is further to generate the measurement related IE comprising the indication of the single DRS based measurement, if the mobility status of the UE is lower than a threshold.

12. The apparatus of claim 9, wherein the control circuitry is further to generate the measurement related IE comprising the indication of the multiple DRS based measurements, if the mobility status of the UE is higher than a threshold.

13. The apparatus of claim 9, wherein the control circuitry is further to generate the measurement related IE comprising the indication of the single DRS based measurement if no contiguous DRS occasions are detected within the measurement period.

14. The apparatus of claim 9, wherein the control circuitry is further to generate the measurement related IE comprising the indication of the multiple DRS based measurements if contiguous DRS occasions are detected within the measurement period.

15. The apparatus of claim 9, wherein the measurement related IE is a MeasObjectEUTRA IE in the LAA scenario.

16. The apparatus of claim 9, wherein the transceiver circuitry is further to receive a DRS based measurement report from the UE, wherein if the measurement related IE indicates the multiple DRS based measurements, the DRS based measurement report is further to comprise an average DRS based measurement result of the multiple DRS based measurements.

17. The apparatus of claim 16, wherein the control circuitry is further to control a mobility management including cell identification, based at least in part on the DRS based measurement report.

18. The apparatus of claim 9, wherein the base station is a master evolved Node B (MeNB).

19. One or more non-transitory, machine-readable media having instructions that, when executed by one or more processors, cause a user equipment (UE) to:
perform, in response to a discovery reference signal (DRS) based measurement request, a single DRS based measurement or multiple DRS based measurements, based at least in part on a measurement related information element (IE), wherein the measurement related IE comprises an indication of whether the single DRS based measurement or the multiple DRS based measurements associated with a license assisted access (LAA) scenario are to be performed; and,
generate a DRS based measurement report, wherein if the measurement related IE indicates the multiple DRS based measurements, the DRS based measurement report further comprises an average DRS based measurement result of the multiple DRS based measurements.

20. The one or more non-transitory, machine-readable media of claim 19, wherein the instructions, when executed, further cause the UE to receive, from a first base station, the discovery reference signal (DRS) measurement request and the measurement related information element (IE).

21. The one or more non-transitory, machine-readable media of claim 19, wherein the measurement related IE is a MeasObjectEUTRA IE in the LAA scenario.

22. The one or more non-transitory, machine-readable media of claim 19, wherein the instructions, when executed, further cause the UE to receive one or more DRS from a second base station in the LAA scenario.

23. The one or more non-transitory, machine-readable media of claim 22, wherein the instructions, when executed, further cause the UE to perform the single DRS based measurement or the multiple DRS based measurements on the one or more DRS.

* * * * *